Patented Aug. 2, 1932

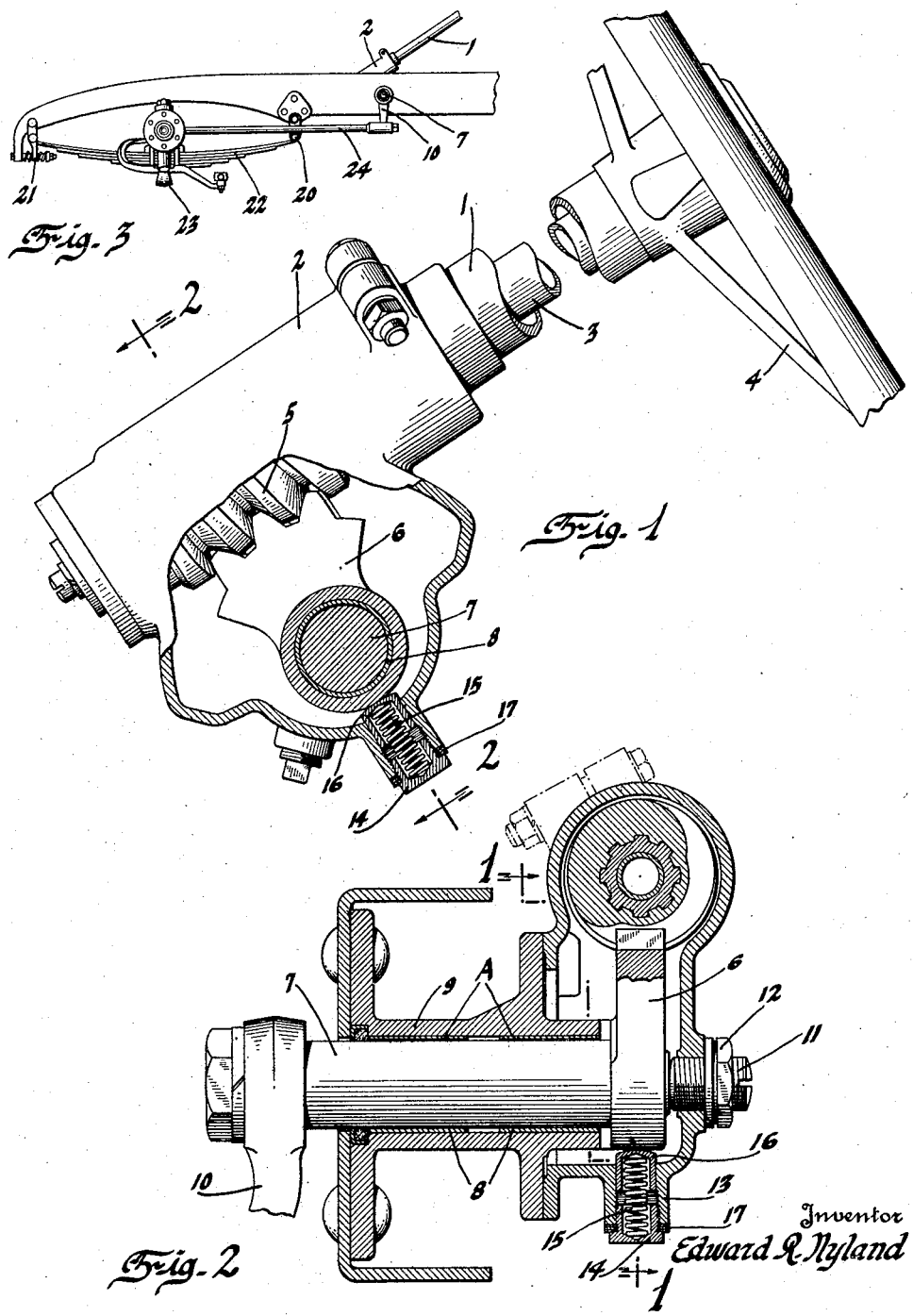

1,869,576

UNITED STATES PATENT OFFICE

EDWARD R. NYLAND, OF DETROIT, MICHIGAN, ASSIGNOR TO GENERAL MOTORS CORPORATION, OF DETROIT, MICHIGAN, A CORPORATION OF DELAWARE

STEERING GEAR

Application filed September 27, 1930. Serial No. 484,789.

This invention relates to steering apparatus, particularly that used on motor vehicles and concerns especially the well known worm and sector type of gear mechanism.

While worm and sector gearing, on the whole, has given satisfactory service, it has been found necessary, for best results, to make frequent adjustments to maintain a snug fit of the gear teeth at the high point in the center of steering gear travel and the present invention has for one of its objects the elimination of the need for frequent adjustments and the maintenance of the gear teeth in proper mesh for long periods of time.

Specifically there is involved the provision of a spring or resilient device to act on the sector at a point diametrically opposite the central high point of tooth engagement to completely lift the sector in its bearing and yieldingly maintain the surface of the teeth in tight contact. This spring, therefore, serves to keep the sector shaft from seating in its bearing until spring pressure is overcome.

In addition to automatically compensating for wear, this arrangement keeps a friction or load between the worm and sector on straight-away travel which reduces the tendency for the transmission of road action on the front wheels to the steering or hand wheel. Since the formation of the gear teeth is such as to give a central high point with increasing clearance on both sides of the high point, to an amount exceeding that in the sector shaft bearings, there will be no tendency toward increased steering stiffness when turning a corner. The spring pressure is so set as to cause no noticeable increase of effort to move the gears through the central portion of the travel and yet afford sufficient resistance to reduce or prevent kick back.

The invention will be better understood upon reference to the accompanying drawing illustrating a preferred embodiment thereof and wherein—

Figure 1 is a side elevation with parts broken away and shown in section, as on line 1—1 of Figure 2 of a steering column with the present device applied thereto.

Figure 2 is a sectional view taken on line 2—2 of Figure 1.

Figure 3 is a somewhat diagrammatic view showing the relation of parts in connection with the spring suspension at the front axle.

Referring to the drawing, the reference numeral 1 indicates the usual steering column having a gear box 2 at its lower end and enclosing a shaft 3 provided with a hand wheel 4 at one end and a worm 5 at its opposite end mounted in suitable bearings in the housing or gearbox 2. Also enclosed within the gear box 2 and engaged with the worm 5 is a section 6 keyed or otherwise secured on a laterally projecting shaft 7, seating in suitable bearings or bushings 8 in a tubular projection or attachment bracket 9 of the gearbox and carrying at its outer end a steering arm or pitman 10 for connection with the steering linkage in the usual fashion. As shown in the drawing, the teeth of the gear and sector have a tight fit at the center with increasing clearance toward the ends. The teeth may be initially brought into proper mesh by the relative adjustment of the box 2 and its supporting block 9. A thrust bearing or set screw 11 contacts with the inner end of the rocker shaft 7 and is adjustably received in an opening through the wall of the gear box 2, a lock nut 12 being threaded on the set screw to hold it in adjusted position.

In the present instance the gearbox or housing 2 is shown as being provided at a place opposite the high point of gear engagement with a hollow boss or tubular projection 13 which is internally screw-threaded near its outer end to receive a plug or nut 14. The nut 14 is formed with a pocket in its inner surface which receives one end of an expansible coil spring 15 whose opposite end is seated in a cup-shaped bearing 16 slidable in the projection 13 for engagement with the peripheral surface on the hub of the sector 6. Shims or washers 17 may be inserted between the head of the nut 14 and the end of the projection 13 to permit variation in the adjustment of spring tension. Thus the cup 16 affords a spring back bearing for the sector, and the spring force tends to lift the shaft 7 in its bearing and prevent separation of the gear teeth so as to maintain the contacting surfaces in tight frictional contact, particularly when the gears are in the central part of their travel.

To accommodate such lifting action it is desirable to provide a certain amount of looseness in the fit of the shaft 7 in its bearing 8, as indicated at A in Figure 2. In practice it has been found that the proper effect is obtained if the innermost bearing bushing or the one closest the sector is made about .004" oversize and the outer bushing somewhere in the neighborhood of .0005" to .001" oversize.

With the construction described, a snug fitting of the interengaging surfaces of the gear teeth will be yieldingly maintained to insure the desired degree of frictional resistance therebetween, and the sector shaft is so held from seating in its bearing until spring pressure is overcome, all of which acts to eliminate the transmission of road shocks to the steering wheel.

An important feature of the present invention is that it can be used to advantage in connection with those vehicles employing special spring shackling of the general type shown in Figure 3 designed for the purpose of damping and preventing the inception of wheel fight and shimmy. This shackling as applied to a number of motor vehicles now on the market involves swinging link connections for both ends of one of the vehicle springs, one of the links as at 20 being of the ordinary free swinging type, and the other as at 21 having springs or other resilient means to yieldably restrict swinging. It is contended by its proponents that this arrangement modifies the action of the vehicle spring 22 and front axle 23 on which the road wheels are swivelled in a way that eliminates shimmy conditions. On the other hand double shackling causes the steering drag link 24 to act as a distance rod or radius member for the front axle and places increased strains on the steering mechanism. The same thing is true where rubber shackles or other connections which allow axle movement are employed. If the frictional resistance in the steering gear is less than the resistance of the modified shackle all the shock will not be absorbed at the shackle and a whip will be transmitted through the steering mechanism to the hand wheel, such reaction or kick back being greatly amplified and most violent if there is any looseness in the gears or if the fit of the toothed surfaces are slightly worn even to an almost infinitesimal amount. It will be seen, therefore, that the present invention avoids the objectionable features of double shackling since it automatically takes up looseness and compensates for wear and insures a tight frictional engagement of the toothed surfaces so that the resistance in the gears exceeds that of the anti-shimmy shackle, whereby road whip is absorbed in the shackle as it should be.

Inasmuch as the expedient herein described assures a frictional resistance to the effects of road action it may be found feasible to reduce or practically eliminate the friction ordinarily provided in the various connections or joints of the steering linkage and heretofore considered necessary to avoid shimmy, and thereby further increase the ease of steering. In some cases the joints may be of a ball bearing or other anti-friction type.

I claim:

1. In steering mechanism of the class described, a driving worm having a course increasing in width from an intermediate portion toward both ends, a sector having teeth receivable within the worm course for the actuation of the sector, means providing a floating axis for the sector, and a resilient device tending to move the axis toward the worm to automatically maintain the sector teeth in close fitting relation with the intermediate portion of the worm course throughout the range of sector travel.

2. In steering mechanism of the class described, a driving worm having a course increasing in width from an intermediate portion toward both ends, a sector having teeth receivable within the worm course for the actuation of the sector, a housing enclosing the worm and sector, a shaft for the sector having a loose fitting bearing in the housing to permit a radial shifting of the shaft axis, and a spring device carried by the housing and engaging a portion of the sector to one side of the shaft axis substantially diametrically opposite that portion engaging the worm to yieldingly urge the shaft axis toward the worm and hold the sector in close fitting relation with the worm throughout the range of sector travel.

3. Steering mechanism, including in combination with a driving worm and a driven sector having teeth in mesh with the worm of a rock shaft carrying said sector, a bearing for the shaft having an inside diameter sufficiently larger than the diameter of the shaft to allow a slight radial movement of the shaft, and resilient means capable of lifting the shaft in its bearing to automatically maintain the sector teeth in tight engagement at the center of steering gear travel.

4. Steering mechanism, including in combination with a driving worm and a driven sector having teeth in mesh with the worm of a rock shaft carrying said sector, a bearing bushing loosely fitted on the shaft to permit the shaft to move radially in its bearing, and a spring backed shoe slidably engaging the sector at a point diametrically opposite to the center of gear travel to lift the shaft in the bushing and maintain the sector teeth in close fitting relation to the teeth of the worm at the center of travel throughout the range of travel.

In testimony whereof I affix my signature.

EDWARD R. NYLAND.